(12) United States Patent
Liu et al.

(10) Patent No.: US 12,362,584 B2
(45) Date of Patent: *Jul. 15, 2025

(54) CONTROLLERS, DEVICES, AND METHODS FOR CONTROLLING DIRECT CURRENT FAST CHARGING DEVICES

(71) Applicant: Rivian IP Holdings, LLC, Irvine, CA (US)

(72) Inventors: Yang Liu, Irvine, CA (US); Steven Schulz, Torrance, CA (US); Ming Li, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,597

(22) Filed: Jan. 26, 2024

(65) Prior Publication Data

US 2024/0204552 A1    Jun. 20, 2024

Related U.S. Application Data

(63) Continuation of application No. 17/330,979, filed on May 26, 2021, now Pat. No. 11,916,424.

(51) Int. Cl.
*H02J 7/00* (2006.01)
*H02M 3/335* (2006.01)

(52) U.S. Cl.
CPC ..... *H02J 7/00714* (2020.01); *H02M 3/33576* (2013.01)

(58) Field of Classification Search
CPC .......... H02J 7/00714; H02M 3/33576
See application file for complete search history.

(56) References Cited

U.S. PATENT DOCUMENTS 10,899,244 B2 * 1/2021 Seong ............... H02M 1/42
11,522,437 B1 12/2022 Sangsefidi et al.
(Continued)

FOREIGN PATENT DOCUMENTS

CN    103166464 A    6/2013
CN    105099178 A    11/2015
(Continued)

OTHER PUBLICATIONS

Office Action for DE Appl. No. 102021133461.6 dated Feb. 9, 2024, with machine translation.
(Continued)

*Primary Examiner* — Drew A Dunn
*Assistant Examiner* — Pamela J Jeppson
(74) *Attorney, Agent, or Firm* — Foley & Lardner LLP

(57) ABSTRACT

Various disclosed embodiments include illustrative controller modules, direct current (DC) fast charging devices, and methods. In an illustrative embodiment, a controller module for a DC-DC converter includes a controller and computer-readable media configured to store computer-executable instructions configured to cause the controller to receive an input voltage $V_{in}$ to the DC-DC converter, receive an output DC voltage $V_o$ from the DC-DC converter, generate control signals configured to control a charging output of the DC-DC converter responsive to the received input voltage $V_{in}$ and output voltage $V_o$, and output the generated control signals to the DC-DC converter.

20 Claims, 7 Drawing Sheets

(56) References Cited

U.S. PATENT DOCUMENTS

| | | |
|---|---|---|
| 2018/0257494 A1 | 9/2018 | Yang et al. |
| 2019/0089190 A1 | 3/2019 | Yang et al. |
| 2019/0106000 A1 | 4/2019 | Heyne et al. |
| 2021/0249963 A1 | 8/2021 | Kajiyama et al. |

FOREIGN PATENT DOCUMENTS

| | | |
|---|---|---|
| CN | 110892628 A | 3/2020 |
| CN | 112217194 A | 1/2021 |
| JP | 6647470 B1 | 2/2020 |
| TW | 200627749 A | 8/2006 |
| WO | WO-2020/031807 A1 | 2/2020 |

OTHER PUBLICATIONS

Office Action on KR Appl. No. 10-2021-0183412 dated Sep. 22, 2023.
Non-Final Office Action for U.S. Appl. No. 17/330,979 dated Jun. 26, 2023.
Notice of Allowance on U.S. Appl. No. 17/330,979 dated Oct. 31, 2023.
Office Action and Search Report on CN Appl. No. 202111617895.X dated Apr. 10, 2025.

\* cited by examiner

CONTROLLERS, DEVICES, AND METHODS FOR CONTROLLING DIRECT CURRENT FAST CHARGING DEVICES

CROSS-REFERENCE TO RELATED APPLICATION

This application claims the benefit of priority under 35 U.S.C. § 120 as a continuation of U.S. Non-Provisional patent application Ser. No. 17/330,979 filed on May 26, 2021, which is hereby incorporated by reference herein in its entirety for all purposes.

INTRODUCTION

The present disclosure relates to electric vehicle charging systems. The statements in this section merely provide background information related to the present disclosure and may not constitute prior art.

A typical direct current fast charging (DCFC) power conversion unit (PCU) includes an alternating current (AC)-DC converter, an isolated DC-DC converter, a current sensor, and a controller. The controller uses sensed current values $I_o$ and $I_{batt}$ that are sensed by current sensors at the output of the DC-DC converter, an input voltage $V_{in}$ to the isolated DC-DC converter, and an output voltage $V_o$ of the DC-DC converter to improve the dynamic performance of the DC-DC converter under varying load/battery conditions.

BRIEF SUMMARY

Various disclosed embodiments include illustrative controller modules, direct current (DC) fast charging devices, and methods.

In an illustrative embodiment, a controller module for a DC-DC converter includes a controller and computer-readable media configured to store computer-executable instructions configured to cause the controller to receive an input voltage $V_{in}$ to the DC-DC converter, receive an output DC voltage $V_o$ from the DC-DC converter, generate control signals configured to control a charging output of the DC-DC converter responsive to the received input voltage $V_{in}$ and the output voltage $V_o$, and output the generated control signals (CS) to the DC-DC converter.

In another illustrative embodiment, a DC fast charging device includes an alternating current (AC)-DC converter configured to generate an input DC voltage $V_{in}$ in response to a received grid AC voltage, a DC-DC converter configured to generate an output DC voltage $V_o$ in response to the input voltage $V_{in}$, and a controller module configured to generate control signals configured to control a charging output of the DC-DC converter responsive to the input voltage $V_{in}$ and the output voltage $V_o$.

In another illustrative embodiment, a method includes receiving an input voltage $V_{in}$ to a DC-DC converter, receiving an output voltage $V_o$ from the DC-DC converter, generating control signals configured to control a charging output of the DC-DC converter responsive to the received input voltage $V_{in}$ and the output voltage $V_o$, and outputting the generated control signals to the DC-DC converter.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
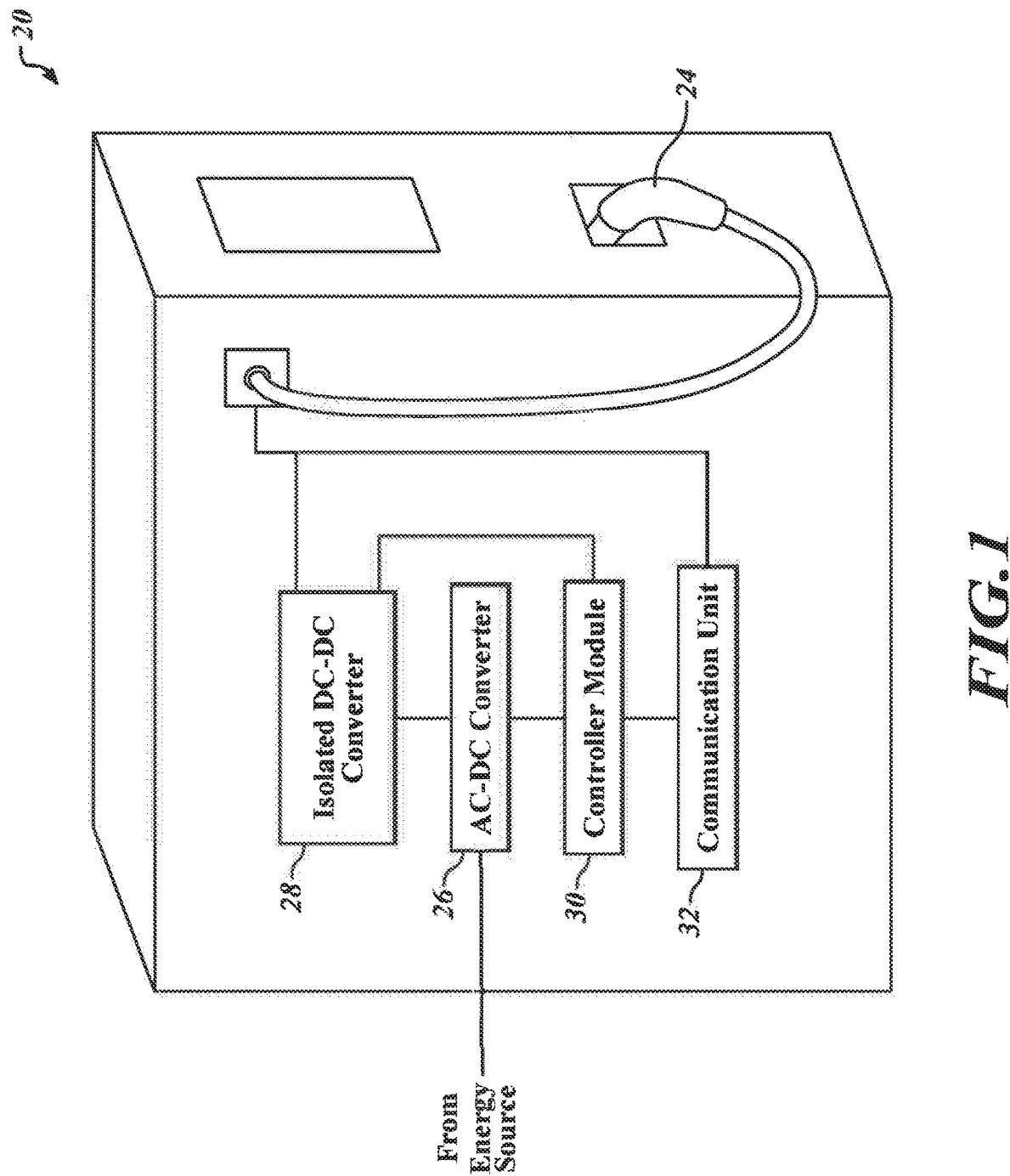
FIG. 1 is a block diagram in partial schematic form of an illustrative DC charging unit.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative controller modules, direct current fast charging (DCFC) devices, and methods.

Referring to FIG. 1 and given by way of overview, in various embodiments an illustrative direct current fast charging (DCFC) unit 20 is provided. In various embodiments the DCFC unit 20 is connected to an alternating current (AC) grid energy source and includes a connector 24 for attaching to input ports on electric vehicles (EV) (not shown) or comparable battery load devices, such as, without limitation, portable rechargeable battery packs or backup power systems. Those skilled in the art will appreciate that the energy source may provide electrical power from a variety of different devices, such as wind turbine, solar cell, geothermal, or any mechanism that can produce electrical power. In various embodiments, internal electronics of the DCFC unit 20 may include an AC-DC converter 26, a DC-DC converter 28 (such as an isolated DC-DC converter), a controller module 30, and a communication unit 32. The AC-DC converter 26 receives AC power from a grid energy source and converts the AC power to DC power that is delivered as input to the DC-DC converter 28

Figure 2:
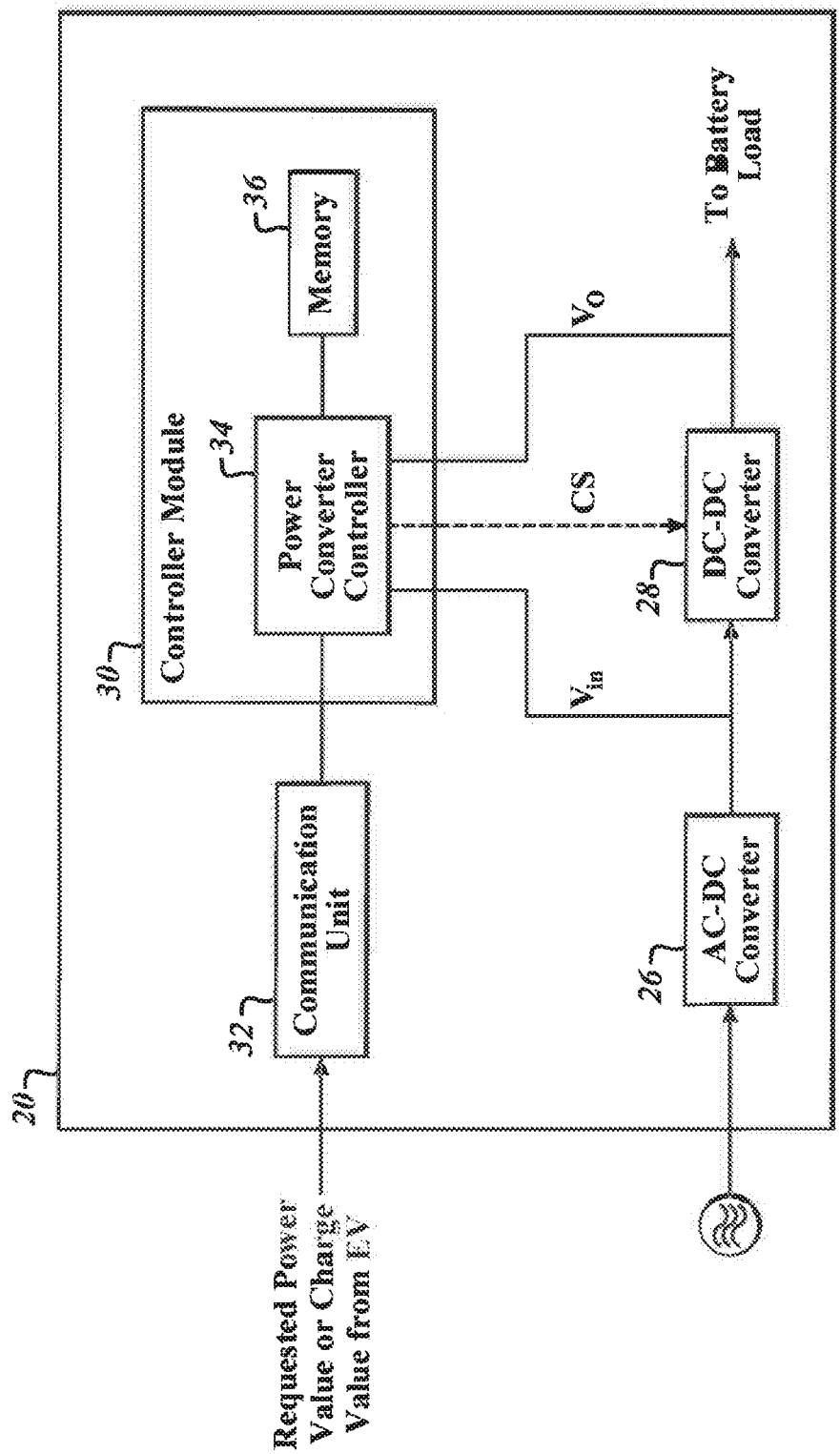
FIGS. 2 and 3 are block diagrams of components of the DC charging unit of FIG. 1.

Referring additionally to FIG. 2, in various embodiments (and as mentioned above) the DCFC unit 20 includes the controller module 30. In some such embodiments the controller module 30 includes a power converter controller (PCC) 34 and a memory (that is, computer-readable media) 36 configured to store instructions. When the stored instructions are executed by the PCC 34, the PCC 34 receives command information from a connected EV and generates control signals for the AC-DC converter 26 and/or the DC-DC converter 28 for providing regulated DC power for recharging batteries of the EV. It will be appreciated that, in various embodiments, the PCC 34 generates the control signals without use of a current sensor(s)—as entailed by currently-known systems—for determining current value of electrical power outputted by the DC-DC converter 28. Instead of measuring current with a sensor, in various embodiments the PCC 34, upon executing further instructions stored in the memory 36, estimates an output current value associated with the DC voltage outputted by the DC-DC converter 28 in response to the voltage outputted by the DC-DC converter 28 and the received command information.

To that end and continuing by way of overview, in various embodiments the controller module 30 for the DC-DC converter 28 includes the PCC 34 and the computer-readable media 36 configured to store computer-executable instructions configured to cause the PCC 34 to receive an input voltage $V_{in}$ to the DC-DC converter 28, receive an output DC voltage $V_o$ from the DC-DC converter 28, generate control signals in response to the received input voltage $V_{in}$ and the output voltage $V_o$, and output the generated control signals to the DC-DC converter 28—without use of a current sensor(s).

It will be appreciated that the PCC 34 may be any type of controller as desired for a particular application, such as, without limitation, a microcontroller or the like. In various embodiments the PCC 34 may include one or more generic or specialized processors such as: microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. In some embodiments, some or all functions may be implemented by a state machine that has no stored program instructions, or in one or more application-specific integrated circuits (ASICs), in which each function or some combinations of certain of the functions are implemented as custom logic or circuitry. It will be appreciated that a combination of the aforementioned approaches may be used. For some of the embodiments described herein, a corresponding device in hardware and optionally with software, firmware, and a combination thereof can be referred to as a "controller configured to" perform a set of operations, steps, methods, processes, algorithms, functions, techniques, etc. on digital and/or analog signals as described herein for the various embodiments.

As discussed above, various embodiments include the non-transitory computer-readable storage medium 36 having computer-readable code (instructions) stored thereon for causing the PCC 34 to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include the instructions executable by the PCC 34 that, in response to such execution, causes performance of a set of operations, steps, methods, processes, algorithms, functions, techniques, etc. as described herein for the various embodiments.

Operation of the PCC 34 is described in more detail below with reference to FIGS. 2-8.

As shown in FIG. 2, in various embodiments the AC-DC converter 26 generates an input DC voltage $V_{in}$. The DC-DC converter 28 receives the input DC voltage $V_{in}$ and generates an output DC voltage $V_o$ for delivery to the battery load of the EV. The communication unit 32 (FIG. 1) receives a requested power value or charging value from the EV. The EV determines what power value is entailed for efficiently recharging the EV battery load. The EV sends the determined power value to the communication unit 32, such as by the connector 24, or wirelessly via a communication protocol, or the like.

In various embodiments, the power converter controller (PCC) 34 receives the input DC voltage $V_{in}$ value (from the AC-DC converter 26), the output DC voltage $V_o$ value (from the DC-DC converter 28), and the requested power value. As will be explained below, in response to the reception of the output DC voltage $V_o$ value (from the DC-DC converter 28) and a current value associated with the requested power value, the PCC 34 determines an estimated output current ($I_{ref}$)—without use of a current sensor(s). The PCC 34 generates control signals CS for the DC-DC converter 28 in response to the $V_{in}$ value (from the AC-DC converter 26), the requested power value (P*=I**V*), and the estimated output current ($I_{est}$).

Figure 3:
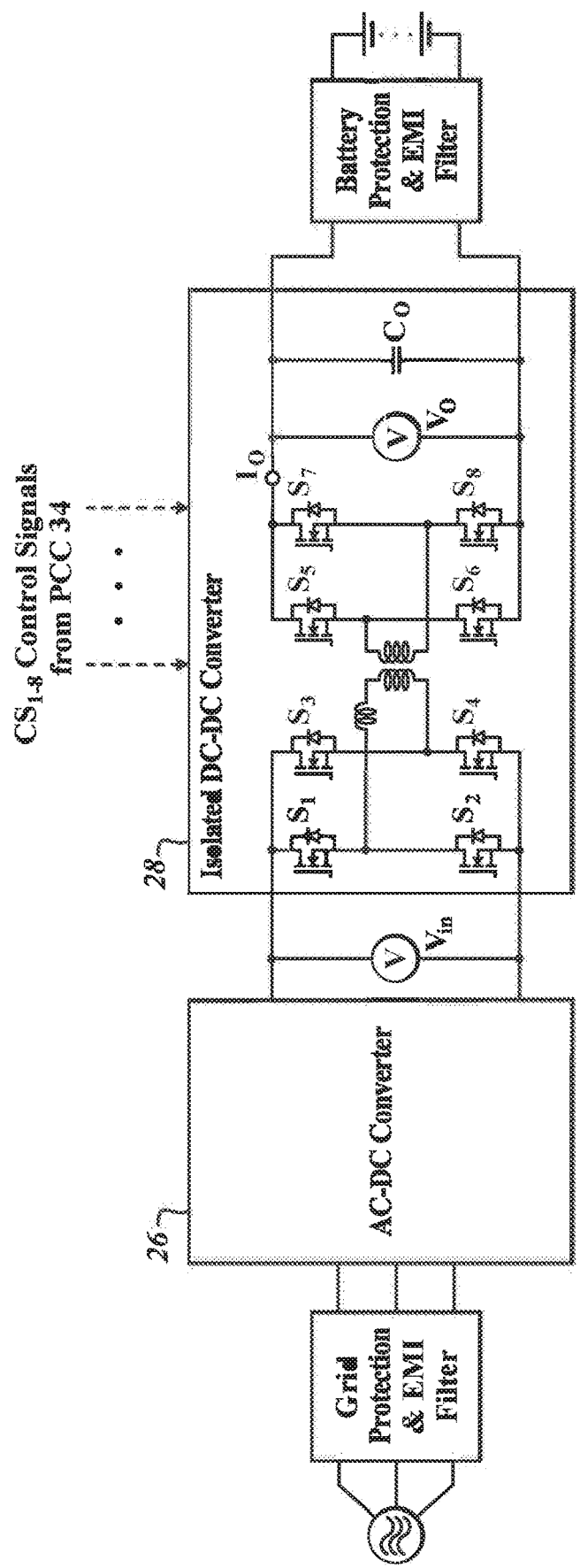

Referring additionally to FIG. 3, in various embodiments components of the DCFC unit 20 suitably are configured to perform power conversion. Given by way of non-limiting examples and as shown in FIG. 3, in various embodiments the control signals CS may include control signals $CS_{1-8}$ that are received by respective switching components, e.g., switches $S_{1-8}$ within the DC-DC converter 28. In various embodiments the DC-DC converter 28 may be an isolated DC-DC converter utilizing components, e.g. a transformer 41 and an inductor 43, to isolate an input set of switching components e.g. switches $S_{1-4}$ from an output set of switching components e.g. switches $S_{5-8}$. It can be appreciated by one of ordinary skill in the art that any DC-DC converter, like the active switching components (switches $S_{1-8}$) may be used. The control signals $CS_{1-8}$ control switches $S_{1-4}$ and switches $S_{5-8}$, thereby controlling a phase offset between switches $S_{1-4}$ and switches $S_{5-8}$. The resulting operation of the switches $S_{1-8}$ results in an output charging value that adjusts for possible battery current using only the outputted voltage $V_o$ value (from the DC-DC converter 28). Illustrative control signals $CS_{1-8}$ for the switches $S_{1-8}$ are shown in more detail below in FIG. 6. In addition to the AC-DC converter 26 and the DC-DC converter 28, the DCFC unit 20 includes a grid protection & electromagnetic interference (EMI) filter 37 disposed between the AC-DC converter 26 and the grid energy source and a battery protection and EMI filter 38 disposed between the DC-DC converter 28 and the battery load.

Figure 4:
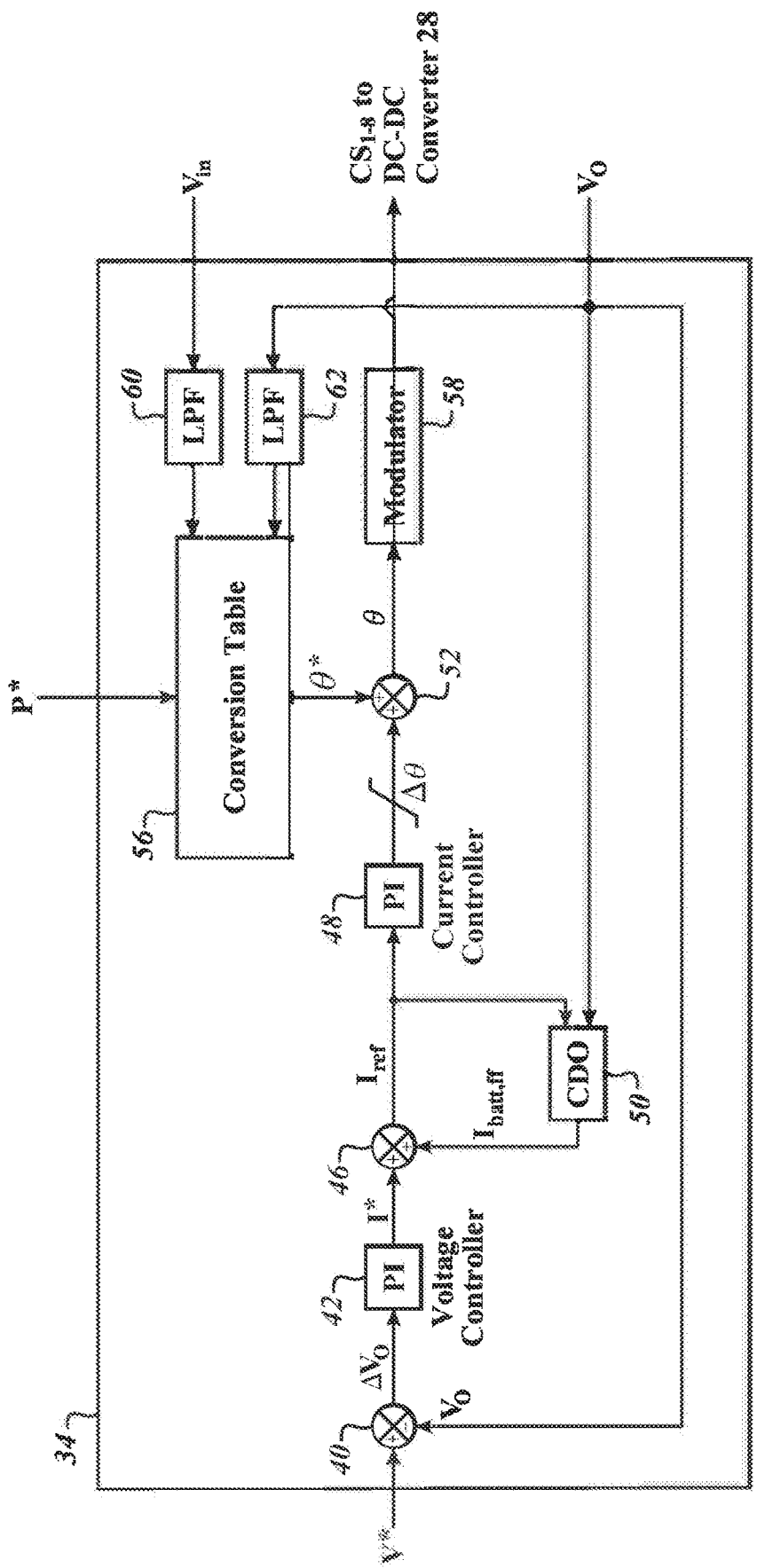
FIG. 4 is a control diagram of voltage mode control functions performed by a controller of FIG. 2.

Referring additionally to FIG. 4, in various embodiments the controller module 30 is configured to perform illustrative voltage mode control functions. In various embodiments the PCC 34 is configured to implement a voltage mode control responsive to various instructions. The voltage mode control functions are implemented in response to the battery load (EV) requesting a voltage V* value. In various embodiments and as shown in FIG. 4, voltage mode control functions may be performed by software and/or firmware as desired. In various embodiments, the requested voltage V* value and the output DC voltage $V_o$ value (from the DC-DC converter 28) are input to a mixer 40. The mixer 40 determines the difference (error) between the requested voltage V* and the $V_o$, value (from the DC-DC converter 28) to produce a $\Delta V_o$ value. Output of the mixer 40, the $\Delta V_o$ value, is entered into a proportional integrator (PI) 42 to produce a determined requested current I*. Output of the PI 42, I*, is fed into a mixer 46 and an estimated load-current feedforward value ($I_{batt,ff}$, or estimated battery current value, also referred to as $I_{est}$) is fed into the mixer 46. The estimated load-current feedforward value $I_{batt,ff}$ is generated by a current disturbance observer (CDO) 50. The CDO 50 receives as input the output DC voltage $V_o$ value (from the DC-DC converter 28) from the DC-DC converter 28 and an output from the mixer 46. It will appreciated by one of ordinary skill that the CDO 50 is a specific application for a disturbance observer or a feedback controller. Operation of the CDO 50 is described in more detail below. The output of the mixer 46 is a reference current $I_{res}$ that is fed back into the CDO 50 and sent to a PI 48. The PI 48 produces a change of phase angle value $\Delta\theta$. The change of phase angle value $\Delta\theta$ is fed to a mixer 52 and a requested phase angle ($\theta$*) (also referred to as a requested phase shift ($\theta$*)) is fed to the mixer 52. The requested phase angle ($\theta$*) is generated by a conversion table 56, such as a look up table. The communication unit 32 (FIG. 1) receives the requested power P* (calculated from requested current I* and requested voltage V*) from the connected EV and applies the requested power P* to the conversion table 56. The input DC voltage $V_{in}$ value (from the AC-DC converter 26) is passed through a low pass filter 60 and is applied to the conversion table 56. The output DC voltage $V_o$ value (from the DC-DC converter 28) is passed through a low pass filter 62 and is applied to the conversion table 56. The conversion table 56 determines the requested phase angle ($\theta$*) from value of the requested power (P*), the output DC voltage $V_o$ value (from the DC-DC converter 28), and the input DC voltage $V_{in}$ value (from the AC-DC converter 26). A phase angle ($\theta$*) is output from the mixer 52. The phase angle ($\theta$) is a phase shift between the control signals $CS_{1-4}$ and the control signals $CS_{5-8}$. This phase shift produces the desired charging current $i_{batt}$. The phase angle ($\theta$) is modulated by a modulator 58 to generate the control signals $CS_{1-8}$ for the DC-DC converter 28.

Figure 5:
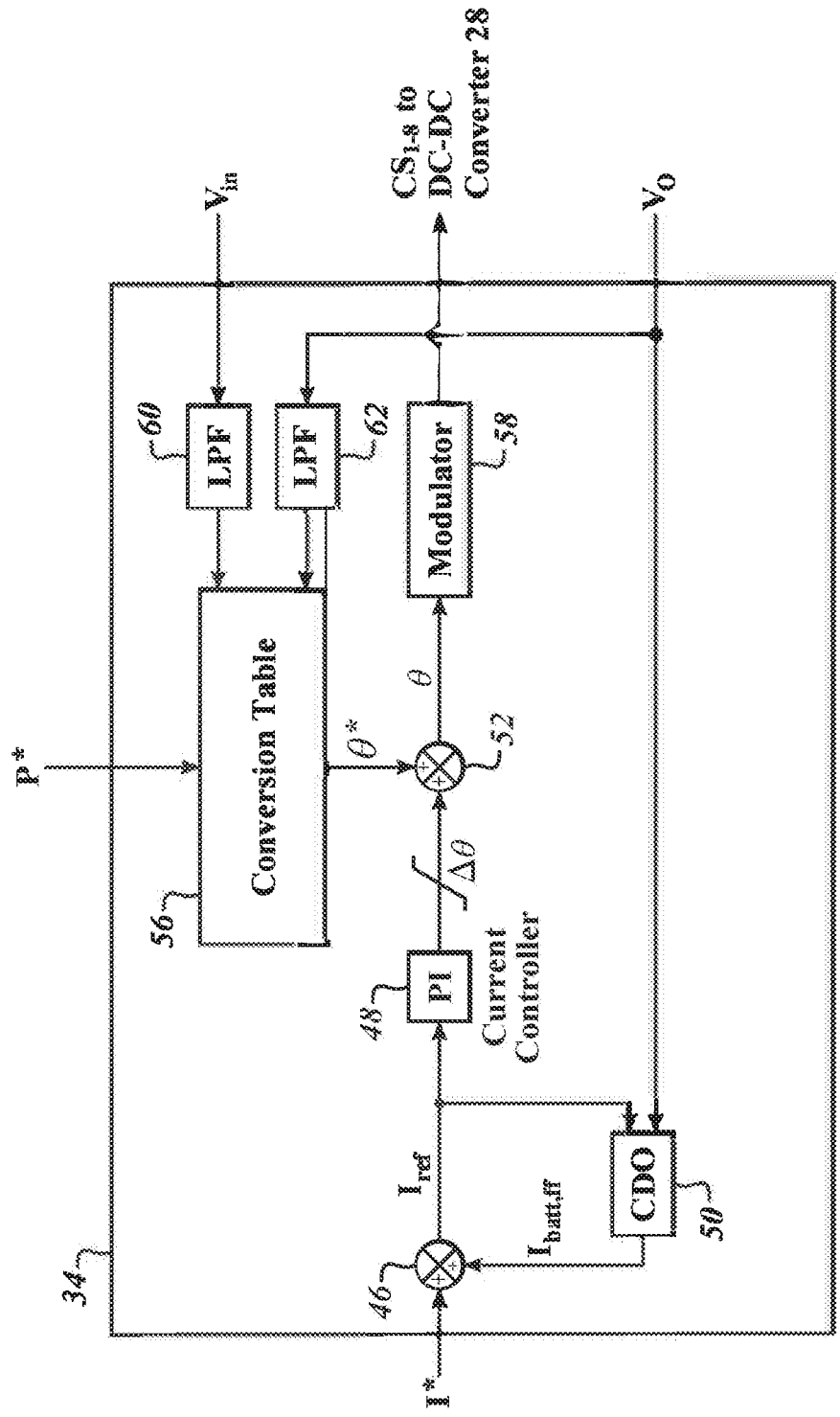
FIG. 5 is a control diagram of current mode control functions performed by a controller of FIG. 2.

Referring additionally to FIG. 5, in various embodiments the controller module 30 is configured to perform illustrative current mode control functions. In various embodiments the PCC 34 is configured to implement a current mode control responsive to various instructions. The current mode control functions are implemented in response to the battery load (EV) requesting a current I* value. As shown in FIG. 5, current mode control functions may be performed by software and/or firmware as desired. In various embodiments, the requested current I* is received from the communication unit 32 (FIG. 1) and is fed to the mixer 46. The estimated load-current feedforward value ($I_{batt,ff}$) (estimated battery current value) is fed into the mixer 46. The estimated load-current feedforward value $I_{batt,ff}$ (estimated battery current value) is generated by the CDO 50. The CDO 50 receives as input the output DC voltage $V_o$ value from the DC-DC converter 28 and an output from the mixer 46. The output of the mixer 46 is a reference current $I_{res}$ that is fed back into the CDO 50 and sent to the PI 48. The PI 48 produces a change of phase angle $\Delta\theta$. The change of phase angle 40 is fed to the mixer 52 and a requested phase angle ($\theta$*) is fed to the mixer 52. The requested phase angle ($\theta$*) is generated by the conversion table 56. The communication unit 32 (FIG. 1) receives the requested power P* from the connected EV and applies the requested power P* to the conversion table 56. The input DC voltage $V_{in}$ value (from the AC-DC converter 26) is passed through the low pass filter 56 and is applied to the conversion table 56. The output DC voltage $V_o$ value (from the DC-DC converter 28) is passed through the low pass filter 62 and is applied to the conversion table 56. The conversion table 56 determines the phase angle ($\theta$*) from value of the requested power (P*), the output DC voltage $V_o$ value, and the input DC voltage $V_{in}$ value (from the AC-DC converter 26). The phase angle ($\theta$) is output from the mixer 52 and is modulated by the modulator 58 to generate the control signals $CS_{1-8}$ for the DC-DC converter 28.

In various embodiments, the estimated load-current feedforward value $I_{batt,ff}$ (estimated battery current value) is used to improve the dynamic responses to load disturbances/battery current changes by the DC-DC converter 28, as set forth below, beginning with:

$$\frac{dV_o}{dt} = \frac{i_{batt} - i_o}{C_o}$$

where $C_o$ is the output capacitance value (from the DC-DC converter 28), $i_o$ is the output current before the output filtering capacitor, and $i_{batt}$ is current after filtering capacitor.

The disturbances of the output voltage $V_o$ (from the DC-DC converter 28) can reflect the changes of the estimated load-current feedforward value $I_{batt,ff}$ (estimated battery current value):

$$i_{batt,ff}(j) = z(j) - lV_o(j)$$

where j is a time value, z is the inner state variable of the CDO 50, and l is a parameter related to the convergence rate. It will be noted that I and i are used interchangeably to denote the same parameter.

In this way, the sensed output voltage $V_o$ can be used for tuning the control loop with the CDO 50, thus regulating the output charging current. Based on the principle of current disturbance observer as well as discrete control law, $i_{batt,ff}(j)$ can be described with a relationship of $i_{ref}(j-1)$, $V_o(j-1)$, inner state variable $z(j-1)$, and convergence rate parameter/l as follows:

$$i_{batt,ff}(j) = \left(1 - \frac{l \cdot T_s}{C_o}\right) \cdot z(j-1) + \frac{l^2 T_s}{C_o} \cdot V_o(j-1) + \frac{l \cdot T_s}{C_o} \cdot i_{ref}(j-1)$$

where z is the inner state variable of the CDO 50, l is a parameter related to convergence rate, convergence rate is a value tuned during testing, $C_o$ is a fixed value that is related to DC-DC converter 28, j is a time value, and $T_s$ is DC-DC converter switching period.

Figure 6:
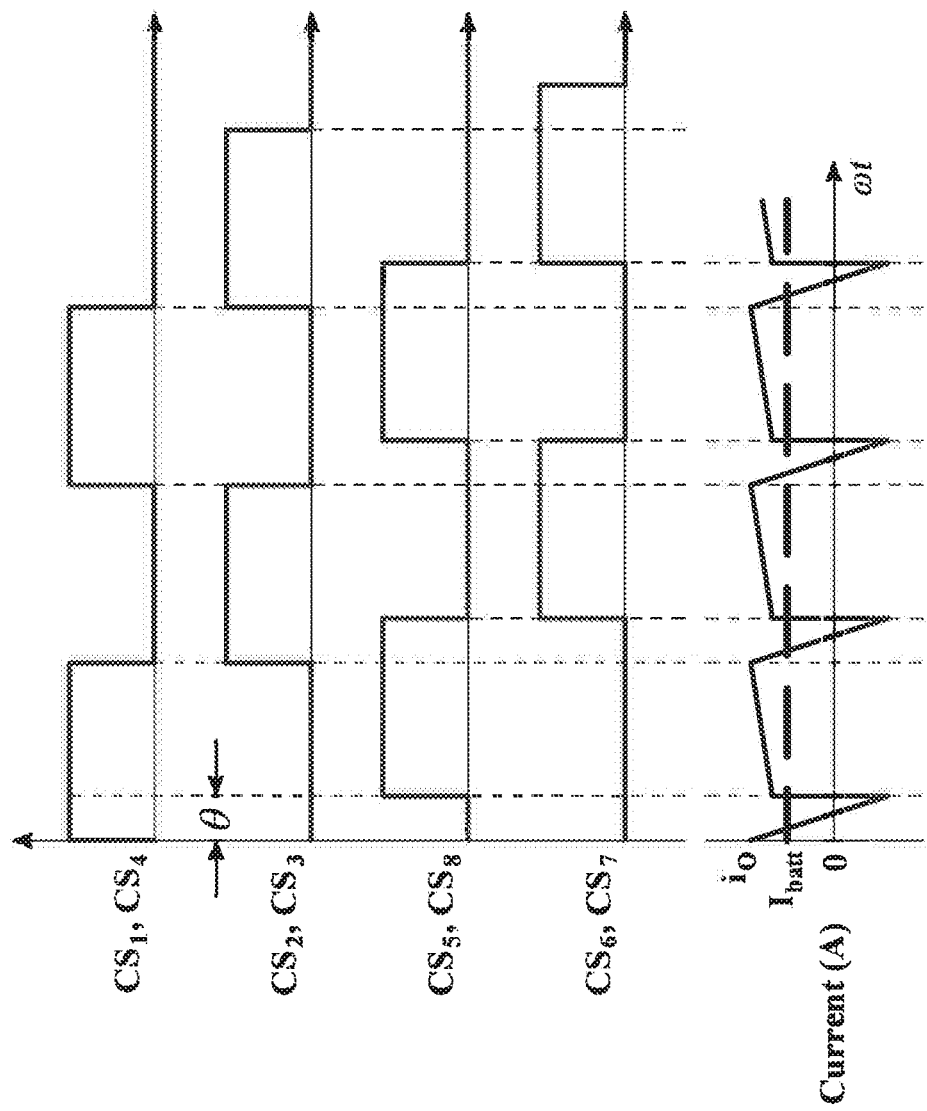
FIG. 6 is diagram of control signals generated by the DC charging unit of FIG. 2.

Referring additionally to FIG. 6, in various embodiments the DCFC unit 20 is configured to generate illustrative control signals suitable for controlling an output of the DC-DC converter 28. In various embodiments the phase angle ($\theta$) is a phase shift between the control signals $CS_{1-4}$ and the control signals $CS_{5-8}$. This phase shift produces the desired charging current $i_{batt}$. For example, a first set of one or more control signals (e.g., $CS_{1,4}$ and complementary control signals $CS_{2,3}$), can have a substantially same first phase. A second set of control signals (e.g., $CS_{5,8}$ and complementary control signals $CS_{6,7}$) can have a substantially same second phase, which is shifted from the first phase by the phase angle (θ), as represented in a diagram 60 and referenced previously with respect to the control diagram shown in FIGS. 4 and 5. As will be discussed in more detail with regards to FIGS. 7 and 8 below, in various embodiments tuning of a phase angle (θ) using the control signals $CS_{1-8}$ can control an output of the DC-DC converter 28.

Figures 7, 8:
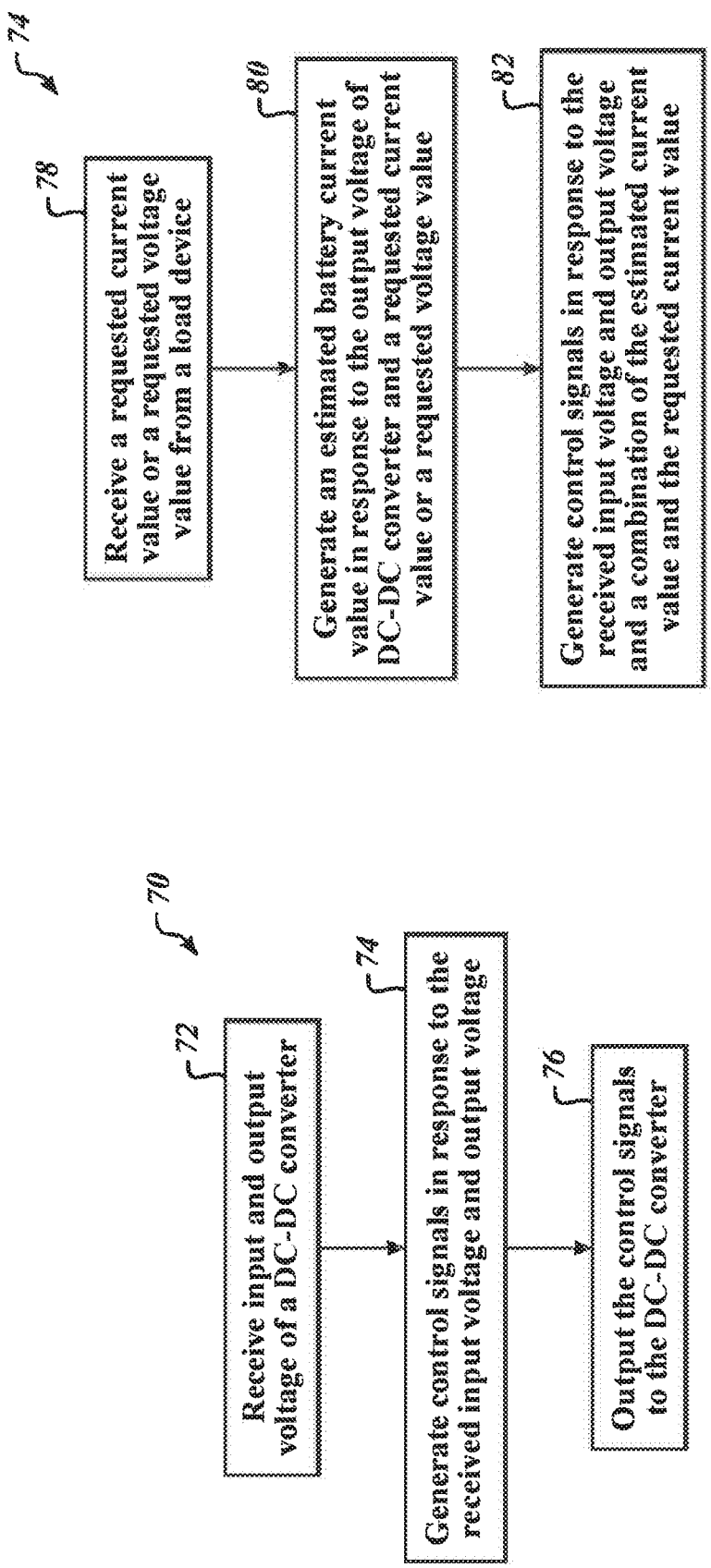
FIG. 7 is a flow chart of an illustrative method for generating power converter control signals.
FIG. 8 is a flow chart of details of the method of FIG. 7.

Referring additionally to FIG. 7, in various embodiments an illustrative method 70 is provided for generating power converter control signals. It will be appreciated that, in some embodiments, the method 70 may be suited for being performed by a controller module and/or a power converter controller executing instruction stored in a memory. At a block 72, input and output voltages of a DC-DC converter are received by a controller. At a block 74, control signals are generated in response to the received input voltage and output voltage of the DC-DC converter. Control signals generation is described in more detail below with reference to FIG. 8. At a block 76, the generated control signals are output to the DC-DC converter.

Referring additionally to FIG. 8, additional illustrative details will be explained regarding portions of the method 70. For example, in various embodiments the process performed at the block 74 (FIG. 7) may be expanded upon. In some such embodiments, at a block 78 a requested power value, such as a requested current value (current mode control) or a requested voltage value (voltage mode control), is received from a load device, such as an EV. In some such embodiments, a requested current value is determined from the received requested voltage value (voltage mode control). In various embodiments, in the voltage mode control, tuning of a phase angle (θ) controls output voltage and, in the current mode control, tuning of the phase angle (θ) controls output current. In various embodiments, at a block 80 an estimated battery current value is generated in response to the output voltage of the DC-DC converter and the received requested current value (current mode control) or the requested current value determined from the received requested voltage value (voltage mode control). In various embodiments, at a block 82 the control signals are generated in response to the received input and output voltages of the DC-DC converter and a combination of the requested current value and the estimated battery current value.

In some embodiments, generating the control signals at the block 82 may include receiving from a load device, such as an EV, a requested charging value such as a received requested current value or a requested voltage value. In some such embodiments, generating the control signals at the block 82 may include determining a requested current value from the received requested voltage value.

In some embodiments, generating the control signals at the block 82 may include generating an estimated battery current value in response to the output voltage of the DC-DC converter and the requested current value, such as the received requested current value or the determined requested current value. In some such embodiments, generating the control signals at the block 82 may include generating a current reference value by combining the requested current value with the estimated battery current value.

In some embodiments, generating the control signals at the block 82 may further include generating a change in phase angle (θ) from the current reference value. In some such embodiments, generating the control signals at the block 82 may further include generating a control signals phase shift in response to the received input voltage $V_{in}$, the output voltage $V_o$, and a received requested power. In some such embodiments, generating the control signals at the block 82 may further include combining the change in phase angle (θ) with the control signals phase shift.

In some embodiments, the input voltage may be generated at an alternating current (AC)-DC converter in response to a received grid AC voltage and the output voltage is sensed at the DC-DC converter.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit or the like of a controller may, at various times, operate as a component/ module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A system, comprising:
   one or more processors, coupled with memory, to:
   generate an estimated battery current value Iest based on an output voltage Vo of a DC-DC converter, and a current value I*, wherein the current value I* is one of received by a controller or determined from a requested voltage value V*;
   generate a current reference value Iref based on the current value I* and the estimated battery current value Iest;
   generate a control signals phase shift $\Theta^*$ based on an input voltage Vin, the output voltage Vo, and a requested power value P*; and
   generate control signals configured to control a charging output of the DC-DC converter based on the input voltage Vin, the output voltage Vo, the estimated battery current value Iest, the current reference value Iref, and the control signals phase shift $\Theta^*$;
   output the generated control signals to the DC-DC converter; and
   control, based on the generated control signal, at least one switch of the DC-DC converter to provide an output DC power to charge at least one battery.

2. The system of claim 1, comprising the one or more processors to:
   receive the input voltage Vin from the controller; and
   receive the output voltage Vo from the controller.

3. The system of claim 1, comprising the one or more processors to:
   generate the estimated battery current value Iest responsive to the output voltage Vo, wherein the output voltage Vo is output of the DC-DC converter, and responsive to the current value I*.

4. The system of claim 1, comprising the one or more processors to:
   generate the estimated battery current value Iest, wherein the current value I* is received from the controller.

5. The system of claim 1, comprising the one or more processors to:
   generate the estimated battery current value Iest, wherein the current value I* is determined from the requested voltage value V*.

6. The system of claim 1, comprising the one or more processors to:
   generate the control signals phase shift $\Theta^*$ responsive to the input voltage Vin, the output voltage Vo, and the requested power value P*.

7. The system of claim 1, comprising the one or more processors to:
   generate the control signals responsive to the input voltage Vin, the output voltage Vo, the estimated battery current value Iest, the current reference value Iref, and the control signals phase shift $\Theta^*$.

8. The system of claim 1, comprising the one or more processors to:
   output the generated control signals to the DC-DC converter.

9. The system of claim 1, comprising the one or more processors to:
   generate a phase angle change value $\Delta\Theta$ based on the current reference value Iref, and generate a phase shift $\Theta$ based on the phase angle change value $\Delta\Theta$ and the control signals phase shift $\Theta^*$.

10. The system of claim 1, wherein the control signals include two sets of control signals.

11. The system of claim 1, comprising:
    the input voltage Vin identified by the one or more processors from an AC-DC converter configured to generate the input voltage Vin in response to a grid AC voltage.

12. A non-transitory computer-readable medium storing processor executable instructions that, when executed by one or more processors, cause the one or more processors to:
    generate an estimated battery current value Iest responsive to on an output voltage Vo of a DC-DC converter, and a current value I*, wherein the current value I* is one of received by a controller or determined from a voltage value V*;
    generate a current reference value Iref by combining the current value I* and the estimated battery current value Iest;
    generate a control signals phase shift $\Theta^*$ responsive to an input voltage Vin, the output voltage Vo, and a requested power value P*; and
    generate control signals configured to control a charging output of the DC-DC converter responsive to the input voltage Vin, the output voltage Vo, the estimated battery current value Iest, the current reference value Iref, and the control signals phase shift $\Theta$;
    output the generated control signals to the DC-DC converter; and
    control, based on the generated control signal, at least one switch of the DC-DC converter to provide an output DC power to charge at least one battery.

13. The non-transitory computer-readable medium of claim 12, comprising instructions to cause the one or more processors to:
    determine the input voltage Vin from the controller; and
    determine the output voltage Vo from the controller.

14. The non-transitory computer-readable medium of claim 12, comprising instructions to cause the one or more processors to:
    generate the estimated battery current value Jest, wherein the current value I* is received from the controller.

15. The non-transitory computer-readable medium of claim 12, comprising instructions to cause the one or more processors to:

generate the estimated battery current value Iest, wherein the current value I* is determined from the voltage value V*.

16. A method, comprising:

generating, by one or more processors coupled with a memory, an estimated battery current value Iest based on an output voltage Vo of a DC-DC converter, and a current value I*, wherein the current value I* is one of received by a controller or determined from a voltage value V*;

generating a current reference value Iref based on the current value I* and the estimated battery current value Iest;

generating a control signals phase shift $\ominus$* based on an input voltage Vin, the output voltage Vo, and a requested power value P*; and generating control signals configured to control a charging output of the DC-DC converter based on the input voltage Vin, the output voltage Vo, the estimated battery current value Iest, the current reference value Iref, and the control signals phase shift $\ominus$*;

output the generated control signals to the DC-DC converter; and control, based on the generated control signal, at least one switch of the DC-DC converter to provide an output DC power to charge at least one battery.

17. The method of claim 16, comprising:

receiving the input voltage Vin from the controller; and
receiving the output voltage Vo from the controller.

18. The method of claim 16, comprising:

generating the estimated battery current value Iest responsive to the output voltage Vo of the DC-DC converter, and responsive to the current value I*.

19. The method of claim 16, comprising:

generating the estimated battery current value Iest, wherein the current value I* is received from the controller.

20. The method of claim 16, comprising:

generating a phase angle change value 40 based on the current reference value Iref, and generating a phase shift $\ominus$ by combining the phase angle change value 40 with the control signals phase shift $\ominus$*.

* * * * *